United States Patent [19]
Koon et al.

[11] 3,828,491
[45] Aug. 13, 1974

[54] COMBINATION JACK, ANCHOR AND HOLD-DOWN APPARATUS

[76] Inventors: Billy W. Koon, P.O. Box 166; Alfred Glenn Sylvester, 412 E. Hamilton, both of Stamford, Tex. 79553

[22] Filed: July 2, 1973

[21] Appl. No.: 375,894

[52] U.S. Cl............... 52/23, 52/122, 52/157, 254/100
[51] Int. Cl............... E04b 7/00, E02d 5/74
[58] Field of Search............... 52/23, 122, 157, 169; 254/100

[56] References Cited
UNITED STATES PATENTS

| | | | |
|---|---|---|---|
| 2,395,033 | 2/1946 | Black | 52/157 |
| 3,664,082 | 5/1972 | Zintel | 52/122 |
| 3,691,703 | 9/1972 | Barnes | 52/23 |
| 3,698,144 | 10/1972 | Stratton | 52/157 |
| 3,750,349 | 8/1973 | Deike | 52/23 |
| 3,789,559 | 2/1974 | Kirkes | 52/169 |

*Primary Examiner*—Henry C. Sutherland
*Attorney, Agent, or Firm*—Wayland D. Keith

[57] ABSTRACT

An adjustable support member and a dual anchor for mobile homes and other instrumentalities which require leveling by jack means and require anchoring against being moved off of the support members by high winds or other hazards. The present structure is so constructed as to provide a screw jack which bindingly and detachably engages the lower faces of beams which screw jack is so constructed as to enable the leveling of the mobile home or the like. Further an earth engaging anchor extends up through the base of the jack, and the base of the jack is secured thereto, as by a wedge, so as to prevent relative movement between the frame of the mobile home, or the like, and the terrain. A still further anchor for the mobile home or the like is provided by a band which passes over the mobile home or the like, which band is secured to the base of the jacks.

9 Claims, 7 Drawing Figures

PATENTED AUG 13 1974

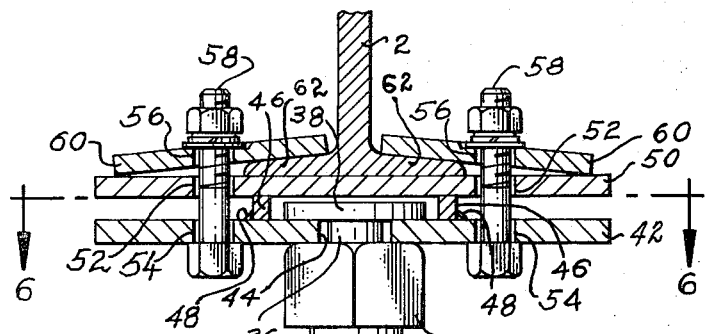
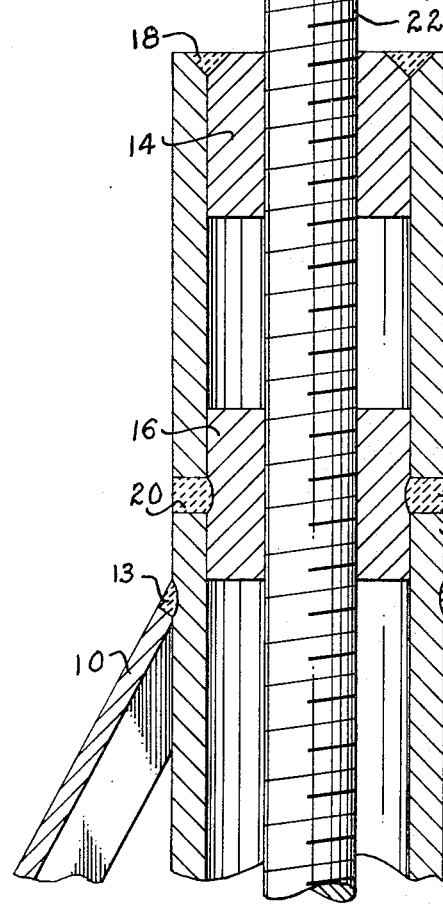
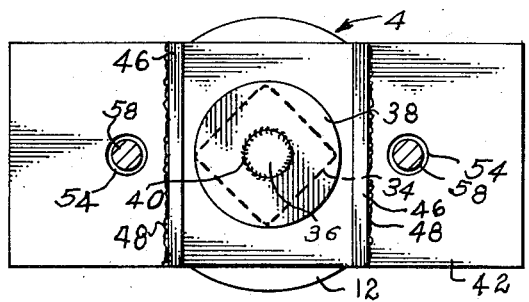
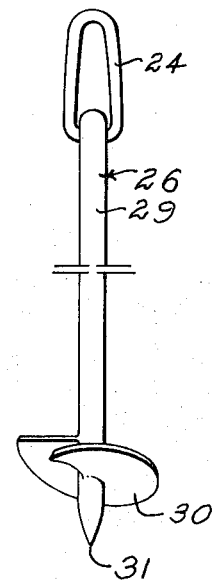

3,828,491

COMBINATION JACK, ANCHOR AND HOLD-DOWN APPARATUS

SUMMARY OF THE INVENTION

This invention relates to improvements in support devices to hold up and to hold down vehicle frames and the like, particularly the frames on which mobile homes are mounted, either for sales displays or for mobile homes or motor homes which are used as living quarters.

Various supports have been proposed heretofore, but these for the most part, were utilized as a support for the mobile home or motor home, and were not detachably connected to the frame-work thereof to enable the support to be readily detached and reused, when desired. Furthermore, the present unit is so constructed as to anchor to the ground in such manner that metal bands or bands of high tensile strength may be used to be secured thereto and pass over the top of the mobile home or motor home at spaced intervals throughout the length thereof so as to maintain the structure stable against winds of high velocity and which will offer resistance to cyclonic conditions.

The present device is so constructed that a minimum of parts are employed for the functions performed, and is so constructed that it may be used for a leveling jack and for "blocking," without the necessity of providing concrete blocks or bricks to block beneath the sills of the mobile home or the like. The present device is so constructed as to be readily attachable to most mobile homes and motor homes with little of no modification, and which will enable mobile homes and the like to be on different type terrain so long as the screws of the support members are still within the threaded nuts of the standard.

OBJECTS OF THE INVENTION

An object of this invention is to provide a support to hold up and to hold down or anchor a frame to the terrain.

Another object of the invention is to provide an adjustable support for a mobile home or the like to enable the leveling of the mobile home.

Still another object of the invention is to provide a detachable support for a mobile home which may be readily secured thereto and removed therefrom without drilling holes therein or welding parts thereto.

Yet another object of the invention it to provide a support for a mobile home which may be secured to the terrain with a spiral earth auger and which is cinched against relative movement between the auger and the support.

Still a further object of the invention is to provide an anchor for a support which is held in fixed relation thereto by a wedge member.

Yet another object of the invention is to provide a support member for a mobile home, which support member has an anchor member thereon, which anchor member has bands to pass over the mobile home to secure the upper portion of the mobile home against relative movement with respect fo the support member.

DESCRIPTION OF THE DRAWINGS

With these objects in mind and others which will become manifest as the description proceeds, reference is to be had to the accompanying drawings in which like reference characters designate like parts in the several views thereof, in which:

FIG. 5 is an enlarged fragmentary elevational view through the upper portion of the support members and the lower portion of the mobile home I-beam, showing the support members and the hold down anchor members clamped to the lower flange of the I-beam of the mobile home or the like;

FIG. 6 is a sectional view taken on the line 6—6 of FIG. 5, looking in the direction indicated by the arrows;

FIG. 7 is a perspective view of an anchor or hold down earth auger, showing a loop on the upper end of the stem to receive a wedge therein.

DETAILED DESCRIPTION OF THE INVENTION

Figure 1:
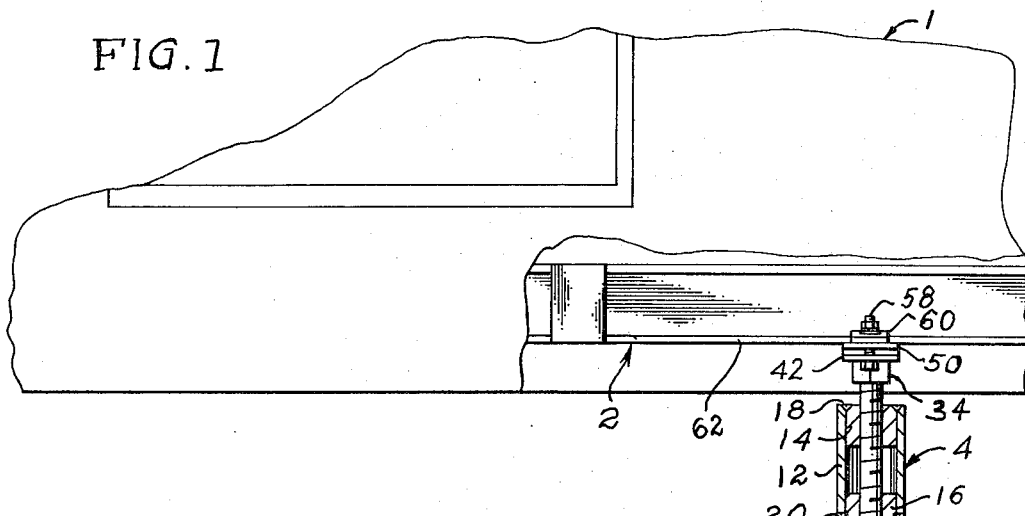
FIG. 1 is a fragmentary elevational view of a mobile home or the like, showing the support member detachably connected thereto, with parts being broken away and with parts being shortened and shown in section to bring out the details of construction.
Figure 2:
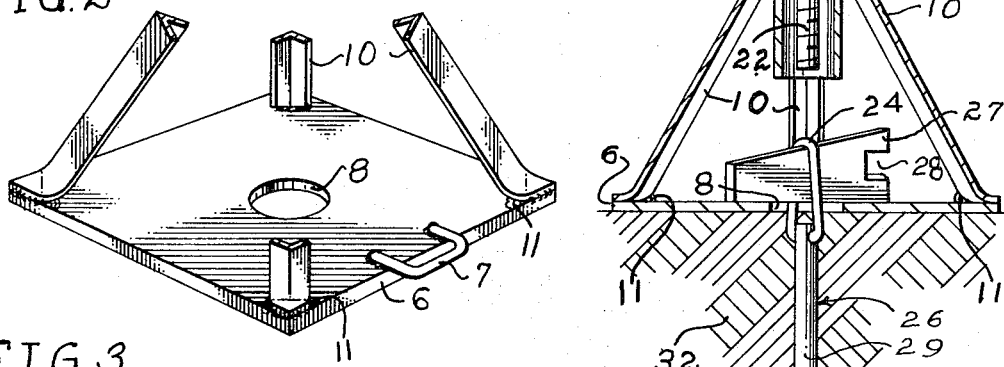
FIG. 2 is a perspective fragmentary view of the lower portion of the base of the support member with the legs being broken away and shown in section, to bring out the details of construction.
Figure 3:
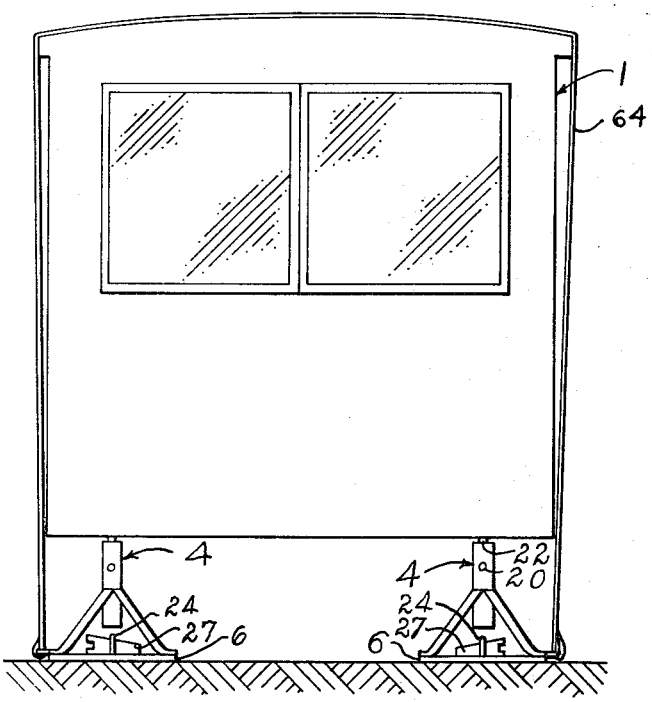
FIG. 3 is an end elevational view of a mobile home or the like, showing support members thereunder, which support the mobile home, and showing anchors connected to the support members to anchor the support members against upward movement, and showing a band attached to the support members for passing over the mobile home to further restrain the mobile home against upward movement.
Figure 4:
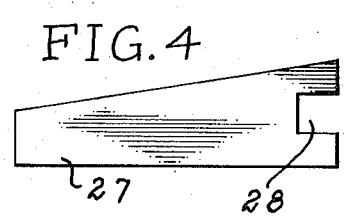
FIG. 4 is a side elevational view of a combination wedge to hold the support members in close relation with the anchor members and a wrench to adjust the screws in the mobile home support members.

With more detailed reference to the drawing, the numeral 1 designates generally an instrumentality, such as a vehicle, a mobile hime, a motor home or the like, having a frame 2 which is generally of I-beam construction and which is normally supported above the ground by support members, designated generally at 4. Each of the support members 4 has a base 6 which base has a hole 8 formed centrally therein, and which base has upwardly extending legs 10 secured thereto, as by welding, as indicated at 11. The legs 10 are secured to a tubular member 12, as by welding as indicated at 13, so as to hold each tubular member 12 substantially perpendicular to the respective bases 6. Each tubular member 12 has spaced apart, screw-threaded nut-like members 14 and 16 therein, which nut-like members are secured in place by welds 18 and 20 respectively. The screw threaded nut-like members are threadably engaged onto threaded member 22 so that the threads will properly register with the nut-like members 14 and 16 and are secured in place after the screw threaded member 22 is threaded onto the members 14 and 16 so that the threads on the screw threaded member 22 serves as a jack to level the mobile home or the like 1, when in place as shown in FIGS. 1 and 3.

The tubular member 12 is a spaced distance above the base 6 so as to enable the base 6 to be seated over the loop or eye 24 of an anchor member 26 so as to enable a wedge member 27 to be inserted between the eye or loop 24 and the base 6 so as to enable the base 6 to be securely anchored to the terrain, in as much as the anchor member has a stem 29 with an earth auger 30 on the lower end thereof to enable the screwing of the anchor member into the ground 32 so that the base 6 will be securely held to the surface of the terrain.

The lower end of the rod or stem 29 is pointed, as indicated at 31 so the earth auger may be readily screwed into the ground by using the wedge member 27 as a handle. The upper end of the screw threaded member 22 has an integrally formed polygonal head 34 thereon which is of a size to be complementally received in the notch 28 which is formed in the wedge member 27, to provide a wrench to enable the mobile home or the like to be leveled.

Extending upwardly above and formed integrally with the screw threaded member 22 and head 34 is a boss 36, which boss is preferably round and extends upward and has a head 38 there on, such as a washer, secured thereto as by welding, as indicated at 40. An elongated, apertured member 42 has a hole 44 formed therein to receive the boss 36 therethrough. The hole 44 is of such diameter as to fit loosely around the boss 36 to enable the turning of screw member 22 therein. Spacers 46, which are of a height greater than the thickness of the washer or head 38, are secured to the elongated, apertured member 42 as by welding, as indicated at 48, so that the head or washer will turn freely when a transverse clamping member 50 is positioned on spacer members 48 above the head 38.

The transverse member 50 is apertured at 52, one aperture on each side of head 38, which apertures are in alignment with apertures 54 in elongated apertured member 42 so that bolts 58 may be passed through apertures 54 and 52 and apertures 56 in hold down brackets 60 so that the top of support member 4 is held in secure relation with the flanges 62 of I-beams 2. In this manner the support member 4 is held against relative movement to I-beams 2.

With the anchor member 26 screwed into the ground, as indicated in FIG. 1 until the eye or loop 24 will extend upward above base 6, the base 6 is placed over the anchor 26 so that the anchor will extend upward through hole 8, as shown in FIG. 1, whereupon, the wedge 27 is driven through eye or loop 24 so as to wedgingly engage the anchor with the upper face of base 6 of the support member 4, which base is usually made of plate steel.

Each member comprising the base 6 has an outstanding loop 7 on a side thereof, which is welded thereto and is of sufficient width to receive a strap 64 of metal or the like therethrough, which strap passes over the mobile home or the like 1 to fasten to a similar loop 7 on the opposite side of each member forming the base 6, as indicated in FIG. 3 so as to deter separation of the upper structure from the lower structure or frame 2, due to wind pressure.

While the invention has been referred to for use with mobile homes, motor homes and other vehicles, it is to be understood that it can be used with any instrumentality which has a frame in need of being anchored to the ground, such as an amusement ride, portable buildings or the like. Depending upon the length of the instrumentality to be anchored to the ground, such as a mobile home, a plurality of these support members is provided to support the weight of the instrumentality on each side thereof, and to hold down the instrumentality against being lifted off the hold downs because of abnormal weather conditions. However, it is to be understood that these are to be made in sizes to take care of normal conditions and to some abnormal conditions. If larger units are used, the instrumentality will, of course, be anchored to a greater degree, however, it is well known that certain cyclonic conditions are beyond the capacity or man or mechanisms to control or to provide protection against.

The present hold up and hold down support and anchor device is easily and quickly set into place or removed, and will withstand all but the most extreme conditions, and is looked upon favorably by cities having ordinances which require the anchoring of mobile homes or the like.

What is claimed is:

1. A combination jack, anchor and hold-down apparatus for an instrumentality, which apparatus comprises;
   a. a base,
      1. said base having a hole formed therethrough,
   b. an anchor member extending through said hole in said base to form an anchor with the ground,
      1. mechanical means detachably securing said anchor to said base,
   c. an upwardly extending, screw threaded, screw receiving member secured to said base,
   d. a screw threaded member threadable engaging said threaded screw receiving member and extending thereabove,
      1. a head on said screw threaded member and secured thereto for rotation therewith to enable the turning of said screw threaded member,
      2. a first apertured plate on the upper end of said screw threaded member,
      3. a reduced end portion of said screw threaded end portion of said screw threaded member passing through one of said apertures in said first apertured plate in journaled relation,
      4. a head secured to the reduced end portion of said screw threaded member above said first apertured plate to enable relative rotation between said plate and said screw threaded member, but restraining said plate against relative longitudinal movement with respect thereto,
      5. spacer elements secured to the upper face of said first apertured plate on at least two sides of said head secured to the upper end of said screw threaded member and being of greater thickness than said head attached to said screw threaded member,
   e. a second apertured plate fitted on said spacer members and supported above said head on said reduced end portion of said screw threaded member,
   f. at least one apertured, detachable hold-down bracket on said second apertured plate and having the aperture therein in register with the apertures of said first and second apertured plates,
      1. a screw threaded bolt fitted through said apertures in said first and second plates and said bracket to bindingly engage said bracket with a portion of said instrumentality to prevent relative movement thereof with respect to the ground.

2. A combination jack, anchor and hold-down apparatus for an instrumentality, as defined in claim 1; wherein
   a. said anchor member is a downwardly extending rod having a pointed end, b. a spiral, screw-like member secured to said downwardly extending rod near the lower end thereof,
1. the lower end of said spiral like member being sharp to engage the ground, when rotated,
c. said rod having a loop formed on the upper end thereof,
d. a bar adapted to be fitted within said loop in binding engagement with the upper face of said base to hold said jack and said hold-down apparatus against relative movement.

3. A combination jack, anchor and hold-down apparatus as defined in claim 2; wherein
a. said bar fitted within said loop of said anchor is a wedge.

4. A combination jack, anchor and hold-down apparatus as defined in claim 1; wherein
a. the instrumentality is a vehicle,
1. the vehicle has a frame member thereunder, which frame member has at least one out-turned flange, which flange is engaged by said hold-down bracket to anchor the vehicle against relative upward movement with respect to the ground.

5. A combination jack, anchor and hold-down apparatus as defined in claim 1; wherein
a. the instrumentality is a vehicle,
1. the vehicle has two frame members thereunder, each which frame member has an out-turned flange, which flanges are each engaged by one said detachable hold-down bracket to anchor the vehicle against relative upward movement with respect to the ground.

6. A combination jack, anchor and hold-down apparatus as defined in claim 1; wherein
a. the instrumentality is a vehicle,
1. the vehicle has two frame members thereunder, each which frame member has at least two flanges thereon, each which flange is engaged by a detachable hold-down bracket to anchor the vehicle against relative upward movement with respect to the ground.

7. A combination jack, anchor and hold-down apparatus as defined in claim 1; wherein
a. said upwardly extending screw threaded, screw receiving member is secured to said base by spaced apart legs, the lower ends of which legs are welded to said base,
1. the upper ends of which legs are secured to said upwardly extending, screw threaded, screw receiving member to maintain said screw threaded, screw receiving member a spaced distance above said base.

8. A combination jack, anchor and hold-down apparatus as defined in claim 1; wherein
a. the instrumentality is a mobile home,
b. each said jack base has an outwardly extending loop thereon to receive a strap therethrough,
c. a strap adapted to be passed over said mobile home and to engage with a loop on a second base member on the opposite side thereof to bindingly secure said mobile home to said bases.

9. A combination jack, anchor and hold-down apparatus as defined in claim 7; wherein
a. said instrumentality is a mobile home,
1. the mobile home has a frame on the lower side thereof,
b. said screw threaded, screw receiving member threadably receiving said screw threaded member on said base to form a jack, the upper end of said jack being adapted to detachably engage the frame of the mobile home, at spaced intervals along each said frame member to enable the leveling of the mobile home and to maintain the mobile home in level condition and against relative movement with respect to the ground.

* * * * *